United States Patent
Gagne

[15] 3,646,951
[45] Mar. 7, 1972

[54] FLUIDIC DEVICES WITH A NEGATIVE PRESSURE GENERATING VENTURI

[72] Inventor: Albert A. Gagne, Huntington, N.Y.
[73] Assignee: Grumman Aerospace Corporation, Bethpage, N.Y.
[22] Filed: Apr. 24, 1970
[21] Appl. No.: 31,566

[52] U.S. Cl. ............................137/81.5, 137/608, 235/201
[51] Int. Cl. .........................................F15c 3/00, F15c 1/10
[58] Field of Search..............137/81.5, 608, 609, 82, 625.28; 235/201 ME

[56] References Cited

UNITED STATES PATENTS

| | | | |
|---|---|---|---|
| 3,285,608 | 11/1966 | Lyman | 137/82 |
| 3,362,633 | 1/1968 | Freeman | 235/201 |
| 3,470,894 | 10/1969 | Rimmer | 137/81.5 |
| 3,552,436 | 1/1971 | Stewart | 137/608 |

*Primary Examiner*—Wlliam R. Cline
*Attorney*—Morgan, Finnegan, Durham & Pine

[57] ABSTRACT

Fluidic devices having a fluid inlet, first and second fluid passages having outlets, means for generating a negative pressure in reference to atmospheric pressure at the second fluid passage as fluid passes through the first fluid passage outlet. The first fluid passage outlet is provided with valves to divert the flow of fluid from the first to the second fluid passage.

6 Claims, 4 Drawing Figures

INVENTOR.
ALBERT A. GAGNE

BY Morgan, Finnegan, Durham & Pine
ATTORNEYS

FLUIDIC DEVICES WITH A NEGATIVE PRESSURE GENERATING VENTURI

BACKGROUND OF THE INVENTION

1. Field of the Invention

The subject invention relates to valved devices for controlling the flow of fluid therethrough. In particular, the invention relates to fluidic and flueric sensing, switching, logic, control and actuating devices.

2. Description of the Prior Art

With the development of fluid circuits to perform logic and control applications, the technology has developed fluidic devices to perform the fluid circuit functions analogous to the electronic circuit functions. The resistor, diode, flip-flop circuit and most of the components found in electronic circuits have their equivalent in fluid circuitry.

Essentially, the fluidic or flueric devices operate to divert or inhibit the flow of fluid in the circuit to perform sensing, switching, logic and control functions. Structurally, the fluidic devices are generally comprised of body structures having conduits formed therein for the flow of fluid therethrough, and means for acting on that flow of fluid to deflect it from or to one of a plurality of alternate paths.

The present state of the art in fluidic devices includes wall attachment devices, beam deflection devices, turbulence amplifiers, vortex amplifiers and electrically controlled fluid amplifiers. Each of the prior art fluidic devices is limited in the number of control signals that can be imposed on the flow of fluid through the fluidic device.

Basically, the present state of the art fluidic devices are designed to divert the flow of fluid from one path to an alternate path. For example, the wall attachment devices, which employ the Coanda effect, necessarily use a structure having a plurality of paths for the flow of fluid, which paths extend from a common junction and a plurality of control ports directed to a common point in the junction area. Positive pressure through one of the control ports will force the flow of fluid against a wall wherein the Coanda effect will take over and direct the flow of fluid along the wall. Similarly, the jet deflection device is provided with a plurality of paths for the flow of fluid therethrough and a plurality of control ports. However, unlike the wall-attachment devices, a pressure from a control port must be continuously applied to deflect the flow of fluid to a desired path. When the pressure from the control port is removed, the flow of fluid will return to the preferred path.

SUMMARY OF THE INVENTION

The fluidic device of the present invention is designed to afford multiple input signals to the fluid circuit.

It is an object of the present invention to provide a fluidic device which can perform multiple digital logic and analog or proportional control functions.

It is a further object of the present invention to provide fluidic devices and components which can be used as actuating and operating devices as well as logic and control devices.

It is a still further object of the present invention to provide fluidic devices and components which can be used as actuating and operating devices as well as logic and control devices.

It is a still further object of the present invention to provide fluidic devices which use only the fluid required to operate the devices and thereby avoid constant venting.

To this end, a fluidic device is provided which includes an input or supply port, an interaction region, a primary flow passage downstream of the interaction region, valve means for controlling the flow of fluid through the primary flow passage and a primary outlet at the termination of the primary flow passage. The fluidic device also includes a second or alternate outlet port arranged normal to the interaction region. The arrangement of the alternate outlet port normal to the interaction region provides inherent means for creating a vacuum in the alternate outlet port when the flow through the interaction region is uninhibited.

The basic design of the fluidic device of the present invention affords a variety of modified embodiments having a plurality of fluid branched passages extending from the primary flow passage. With the plurality of branches, each having at least one valve arranged therein, the flow through the primary passage can be varied or completely blocked. With the flow through the primary passage completely blocked, the interaction region will cease to generate a vacuum on the alternate outlet and cause fluid from the input to travel through the alternate outlet. As a consequence, any of a variety of fluidic components such as AND/NAND gates, OR/NOR gates, digital to analog converters, proportional amplifiers and switching devices can be constructed using the basic structural design of the present invention.

DESCRIPTION OF THE DRAWINGS

The present invention will be more readily understood when considered with respect to the following drawings wherein.

DESCRIPTION OF THE PREFERRED EMBODIMENT

The present invention is directed to a structure having virtually universal application in fluidic or fluid power component technology. Essentially, the structure of the fluidic device has an inlet for the flow of fluid and a primary flow passage extending downstream from the inlet. An interaction zone is located immediately downstream of the fluid inlet. The interaction zone provides a passage for the fluid to enter a primary flow path and is adapted to communicate with a second or alternate flow passage. The alternate flow passage is arranged normal to the interaction zone, thus a negative pressure or vacuum condition is created in the alternate flow passage by the flow of fluid through the interaction zone. It is essential that the interaction zone be constructed to generate a negative pressure in reference to atmospheric pressure, or vacuum in the alternate passage while fluid is flowing through the primary passage. This feature insures that a 0 (no pressure) signal exist at the outlet of the alternate passage when a 1 (pressure) signal is at the outlet of the primary flow passage. When the device is used as an analog or proportional device, absolute zero pressure can be used as a reference rather than atmospheric pressure.

The primary passage may be provided with a plurality of input signals which may be in the form of branched paths having control valves arranged therein with the only critical limitation being that there must be at least one combination of valve orientation that will completely prevent flow from passing through the primary passage.

Figure 1:
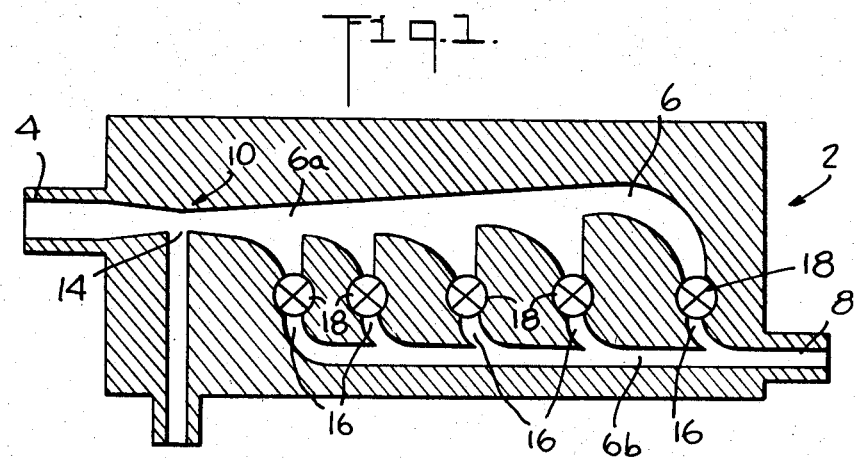
FIG. 1 is a cross-sectional view of a fluidic logic device embodying the present invention which is constructed to perform the functions of an AND/NAND gate or OR/NOR gate with multiple controls.

The embodiment of the subject invention depicted in FIG. 1 discloses a fluidic logic device 2 arranged to function as an AND/NAND or OR/NOR gate. The logic device 2 is in the form of a block having an inlet port 4 arranged to deliver source fluid to a main flow passage 6 and ultimately to an outlet port 8. An interaction region 10 is located between the inlet port 4 and the main passage 6 and has extending therefrom at a right angle or normal thereto an alternate outlet passage 12. The interaction region 10 is provided to facilitate the transfer of the source air from inlet 4 to the main flow passage 6 and concomitantly to generate a negative pressure or vacuum condition in the alternate vacuum passage 12. Structurally, the interaction region can take the form of a vacuum pump, jet ejector, orifice plate or any similar vacuum generating device. However, practice has taught that a converging, diverging nozzle or venturi tube structure having the alternate outlet passage 12 extending perpendicularly from the throat 14 provides a particularly suitable interaction region assembly.

The main flow passage 6 is comprised of an upstream section 6a and a downstream section 6b. A plurality of control flow passages 16 provide communication between the main flow passage upstream section 6a and the downstream section 6b. Each of the control flow passages 16 is provided with a control valve 18. Structurally, the control valves 18 can be any commercial valve capable of fully opened or fully closed orientation. In practice, it has been found that fluidic, vented vortex valves perform particularly well. The valves must be arranged to open and close on input signals, however, the valves and input signals can be of any type such as mechanical, electrical, pneumatic or hydraulic.

In operation, fluid is passed through inlet port 4, through the interaction region 10 and through the main passage 6 to the outlet port 8. This operation will continue as long as any one of the branched passages 16 is open. However, when all of the valves 18 have been closed to prevent the flow of fluid through the main passage 6 to the outlet port 8, the flow is forced from the throat 14 through the alternate outlet passage 12. As can be seen, the AND/NAND operation occurs if the valves 18 are all set to be open during normal operation. Consequently, as any signal or combination of signals other than complete closure of all of the valves 18 is given, flow will continue through the outlet port 8 and there will be a 1 (pressure) signal at the outlet port 8 and a 0 (no pressure) signal at the outlet of alternate passage 12. However, when all of the valves 18 are signaled to close, the fluid will cease flowing through the outlet port 8 and flow from the throat 14 through the alternate outlet port 12. Consequently, the 0 (no pressure) signal will be at the outlet port 8 and the 1 (pressure) signal will be at the outlet of the alternate passage 12.

Conversely, the fluidic device 2 can be arranged to operate as an OR/NOR gate. With the valves 18 set in a closed position during normal operation, flow of fluid will be from the inlet port 4 through the interaction region 10 to the alternate outlet passage 12. Upon a signal opening any one of the valves 18, the fluid flow will pass from the inlet port 4 through the main flow passage 6 to the outlet port 8. The flow of fluid through the interaction region 10 will create a negative pressure at the throat 14 to evacuate the alternate outlet passage 12 and generate a 0 (no pressure) signal in the passage 12.

Figure 2:
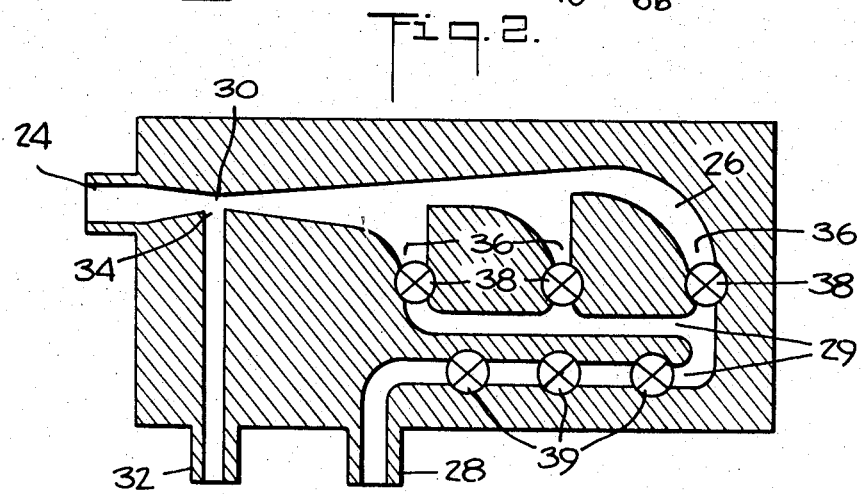
FIG. 2 is a cross-sectional view of a fluidic device embodying the present invention which has been constructed to perform the functions of an AND/NAND and OR/NOR gate with multiple controls.

The device depicted in FIG. 2 is an embodiment of an AND/NAND and OR/NOR gate. As in FIG. 1, the inlet port 24 and main flow passage 26 have arranged therebetween an interaction zone 30. The alternate outlet passage 32 is again arranged normal to the interaction zone 30 at the throat 34 thereof. However, a plurality of branched passages 36 having control valves 38 are arranged in parallel to deliver fluid to an intermediate passage 29 which terminates in an outlet port 28. The intermediate passage 29 is also provided with a plurality of valves 39 arranged in series.

In operation, the flow of fluid will pass from the inlet 24 to the outlet 28 if any one of the valves 38 is open and all of the valves 39 are open. Concomitantly, the flow of fluid through the interaction zone 30 creates a negative pressure at the outlet of the alternate outlet passage 32. Thus, the 1 (pressure) signal is at the outlet port 28 while the 0 (no pressure) signal is at the outlet of the alternate outlet passage 32. The signals can be reversed by closing any one of the valves 39 or all of the valves 38. With the flow of fluid prevented from passing through the outlet 28, the flow of fluid will necessarily pass through the alternate outlet passage 32. Therefore, the 1 (pressure) signal will be at the outlet of the alternate passage 32 and the 0 (no pressure) signal will be at the outlet 28.

Figure 3:
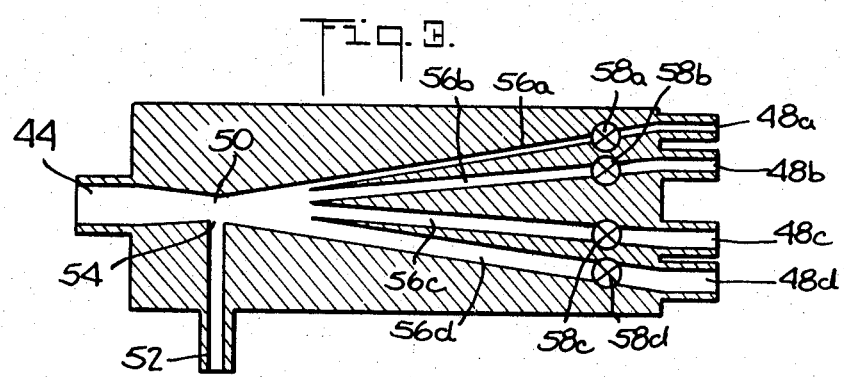
FIG. 3 is a cross-sectional view of an embodiment of the present invention constructed to function as a proportional amplifier, a digital to analog converter, a proportional pressure and flow control device, a proportional switching device, a pressure or flow summing junction and an analog to digital converter.

The device depicted in FIG. 3 is an embodiment of the present invention adapted to function as a proportional amplifier, digital-to-analog converter, proportional pressure and flow control device, proportional switching device, pressure or flow summing junction or analog-to-digital converter. Again, as in FIGS. 1 and 2, the inlet port 44 and main flow passage 46 have an interaction region 50 arranged therebetween. The alternate outlet passage 52 is arranged to extend normal to the throat 54 of the interaction region 50. However, extending from the main flow passage 46 are a plurality of individual passages 56, each having a different cross-sectional area. Each of the passages 56a, b, c, d are provided with respective valves 58a, b, c, d and each passage 56a, b, c, d terminates in a distinct outlet port 48a, b, c, d. Since the flow of fluid in the main passage 46 is at a constant pressure, the pressure in each of the lines 56a–d can be varied by opening or closing, either discretely or proportionally, any one of the valves 58a–d associated with any passage 56a–d. As a consequence, amplification at any outlet 48a–d can be realized. For example, if valved 58b, c and d are closed, all of the fluid from passage 46 must pass through passage 56a, and ultimately out of passage 48a.

As the flow through the passages 56a–d is regulated by the opening and closing of the valves 58a–d, the pressure in the alternate outlet passage 52 is varied. The less the flow of fluid through the outlets 48a–d, the less vacuum or negative pressure will be generated in the alternate outlet passage 52. At some point, when the flow of fluid through outlets 48a–d has been sufficiently attenuated, the vacuum or negative pressure in the alternate outlet passage 52 will be destroyed and fluid will flow through both the outlet of the alternate flow passage 52 and one of the flow outlets 48a–d.

It has been discovered that the passages 56a–d can all be kept at the same cross-sectional area and the valve setting on each valve 58a–d can be regulated to provide any distribution of flow through the outlets 48a–d and the outlet of the alternate flow passage 52.

Figure 4:
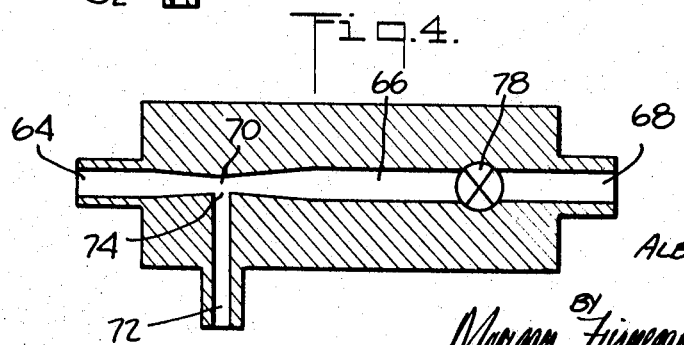
FIG. 4 is a cross-sectional view of an embodiment of the present invention constructed to function as a fluid diverter valve or switch with either proportional or direct on-off switching.

The embodiment of the fluidic device shown in FIG. 4 is a diverter valve or switch with either proportional or direct on-off switching. The inlet port 64 and main flow passage 66 have an interaction region 70 arranged therebetween and alternate flow passage 72 extending normal to the throat 74 of the interaction region 70. The single main flow passage 66 is provided with a valve 78 and terminates in an outlet 68. As a signal is imposed on the valve 78 to open or close to any degree, the pressure at the throat 74 at the interaction region 70 is varied. As a consequence, the flow through the alternate outlet 72 and the outlet 68 can be divided in any manner chosen.

As can be seen from the various embodiments of the present invention, the structure must include an inlet port, an interaction region, an outlet port and an alternate outlet passage extending from the interaction region. The design must be such that a negative pressure can be created at the alternate outlet passage when flow through the outlet port is occurring. With this basic design, any arrangement of valved passages can be provided to form a logic device capable of the desired functions. The input controls of the valves in the device can be operated in any manner. However, the structure of the present invention is particularly suited for independent control of each valve. With independent control of each valve, the maximum number of input signals can be sent to each device.

What is claimed is:

1. A fluidic digital logic device for use as an AND/NAND or OR/NOR gate comprising:
   a main fluid passage first section having a fluid inlet;
   a main fluid passage second section having a fluid outlet;
   a plurality of branched passages connecting the main fluid passage first section and the main fluid passage second section;
   valve means in each of the branched passages;

an alternate fluid passage in fluid communication with the main fluid passage first section; and means for generating a vacuum in the alternate fluid passage as fluid is flowing through the main fluid passage outlet.

2. A fluidic digital logic device as in claim 1 wherein the means for generating a vacuum in the alternate fluid passage as fluid is flowing through the main passage second section outlet is a venturi in the main fluid passage first section arranged with the throat thereof in communication with the alternate fluid passage.

3. A fluidic digital AND/NAND and OR/NOR gate comprising:
- a main fluid passage first section having a fluid inlet;
- a main fluid passage second section having an outlet;
- a main fluid passage intermediate section located between the main fluid passage first section and the main fluid passage second section;
- a plurality of passages connecting the main fluid passage first section and the main fluid passage intermediate section;
- a valve in each passage connecting the main fluid passage first section and the main fluid passage intermediate section;
- a plurality of independently controlled valves arranged in series in the main fluid passage second section;
- an alternate fluid passage in fluid communication with the main fluid passage first section; and
- means for generating a vacuum in the alternate fluid passage as fluid is flowing through the main fluid passage second section outlet.

4. A fluidic digital logic device as in claim 3 wherein the means for generating a vacuum in the alternate fluid passage as fluid is flowing through the main passage second section outlet is a venturi in the main fluid passage first section arranged with the throat thereof in communication with the alternate fluid passage.

5. A fluidic control device comprising:
- a main fluid passage first section having a fluid inlet;
- a plurality of main fluid passage second sections extending from the main fluid passage first section, each main fluid passage second section having a fluid outlet;
- an alternate fluid passage in fluid communication with the main fluid passage first section;
- means for generating a negative pressure in the alternate fluid passage when fluid is flowing through the main fluid passage second section outlets; and
- an independently controlled valve in each main fluid passage downstream sections.

6. A fluidic control device as in claim 5 wherein the means for generating a negative pressure in the alternate fluid passage is comprised of a venturi in the main fluid passage first section arranged with the throat thereof in communication with the alternate fluid passage.

* * * * *